United States Patent
Kato

(10) Patent No.: US 11,634,012 B2
(45) Date of Patent: Apr. 25, 2023

(54) CAB FOR WORK MACHINE AND WORK MACHINE

(71) Applicant: KOMATSU LTD., Tokyo (JP)

(72) Inventor: Yasunari Kato, Tokyo (JP)

(73) Assignee: KOMATSU LTD., Tokyo (JP)

( * ) Notice: Subject to any disclaimer, the term of this patent is extended or adjusted under 35 U.S.C. 154(b) by 176 days.

(21) Appl. No.: 16/966,064

(22) PCT Filed: Mar. 12, 2019

(86) PCT No.: PCT/JP2019/009882
§ 371 (c)(1),
(2) Date: Jul. 30, 2020

(87) PCT Pub. No.: WO2019/230113
PCT Pub. Date: Dec. 5, 2019

(65) Prior Publication Data
US 2020/0354925 A1    Nov. 12, 2020

(30) Foreign Application Priority Data
May 29, 2018   (JP) .............................. JP2018-102489

(51) Int. Cl.
*B60J 5/04*     (2006.01)
*E02F 9/16*     (2006.01)
*B62D 33/06*    (2006.01)

(52) U.S. Cl.
CPC .......... *B60J 5/047* (2013.01); *B62D 33/0617* (2013.01); *E02F 9/163* (2013.01); *E02F 9/166* (2013.01);
(Continued)

(58) Field of Classification Search
CPC .. B60J 5/04; B60J 5/047; B62D 33/06; B62D 33/0617; B62D 33/063; E02F 9/16
(Continued)

(56) References Cited

U.S. PATENT DOCUMENTS

2009/0195026 A1*   8/2009   Bell .................... B60J 5/0487
                                                  296/190.11
2014/0062135 A1*   3/2014   Gielda ................ B60J 5/0487
                                                      49/506
(Continued)

FOREIGN PATENT DOCUMENTS

CN       202937087 U    5/2013
EP        3118398 A1    1/2017
(Continued)

OTHER PUBLICATIONS

English translation of JP 2012-154069; retrieved via PatentTranslate located at www.epo.org. (Year: 2022).*

*Primary Examiner* — Jason S Daniels
(74) *Attorney, Agent, or Firm* — Faegre Drinker Biddle & Reath LLP

(57) ABSTRACT

Provided is a cab for a work machine capable of preventing an actuator from being damaged by vibration. A cab body is formed with a doorway. A door is rotatably supported on the cab body. The door opens and closes the doorway. A closed position locking unit locks the door so as to disable it from rotating relative to the cab body. The actuator generates a driving force to unlock the door locked by the closed position locking unit. The actuator is mounted on the cab body and is supported by the cab body.

6 Claims, 12 Drawing Sheets

(52) U.S. Cl.
CPC ... *B60Y 2200/412* (2013.01); *B60Y 2200/415* (2013.01); *B62D 33/06* (2013.01)

(58) Field of Classification Search
USPC ............... 296/146.4, 146.11, 190.08, 190.11
See application file for complete search history.

(56) References Cited

U.S. PATENT DOCUMENTS

| | | | | |
|---|---|---|---|---|
| 2015/0283886 | A1* | 10/2015 | Nania | ..................... E05F 15/73 49/31 |
| 2017/0320171 | A1* | 11/2017 | Strusinski | ............ B23K 35/362 |
| 2018/0100289 | A1 | 4/2018 | Hamaguchi et al. | |
| 2020/0181966 | A1* | 6/2020 | Kato | .......................... B60J 5/04 |

FOREIGN PATENT DOCUMENTS

| | | |
|---|---|---|
| JP | S56-022889 A | 3/1981 |
| JP | S62-080964 U | 5/1987 |
| JP | H07-138988 A | 5/1995 |
| JP | H08-104141 A | 4/1996 |
| JP | 2000-160599 A | 6/2000 |
| JP | 2003-214022 A | 7/2003 |
| JP | 2004-143687 A | 5/2004 |
| JP | 2008-285910 A | 11/2008 |
| JP | 2012-154069 A | 8/2012 |
| JP | 2013-174046 A | 9/2013 |
| JP | 2016-145465 A | 8/2016 |
| JP | 2017-043298 A | 3/2017 |
| WO | WO-2017/033640 A1 | 3/2017 |

\* cited by examiner

CAB FOR WORK MACHINE AND WORK MACHINE

TECHNICAL FIELD

The present disclosure relates to a cab for a work machine and a work machine including the cab.

BACKGROUND ART

Japanese Patent Laying-Open No. 2017-43298 (PTL 1) discloses a technique that uses a single motor to continuously unlock a door of a vehicle which is locked by a door catcher and open the door.

CITATION LIST

Patent Literature

PTL 1: Japanese Patent Laying-Open No. 2017-43298

SUMMARY OF INVENTION

Technical Problem

The motor disclosed in the above-mentioned document is housed in the door. It is assumed that the vibration of the vehicle is easily transmitted to the motor, and thereby, the motor is damaged by the vibration.

The present disclosure provides a cab for a work machine and a work machine capable of preventing an actuator from being damaged by the vibration.

Solution to Problem

According to the present disclosure, a cab for a work machine is provided. The cab includes a cab body, a door, a locking unit, and an actuator. The cab body is formed with a doorway. The door is rotatably supported on the cab body. The door opens and closes the doorway. The locking unit locks the door so as to disable it from rotating relative to the cab body. The actuator generates a driving force to unlock the door locked by the locking unit. The actuator is mounted on the cab body and supported by the cab body.

Advantageous Effects of Invention

According to the present disclosure, it is possible to prevent the actuator from being damaged by vibration.

DESCRIPTION OF EMBODIMENTS

Figure 1:
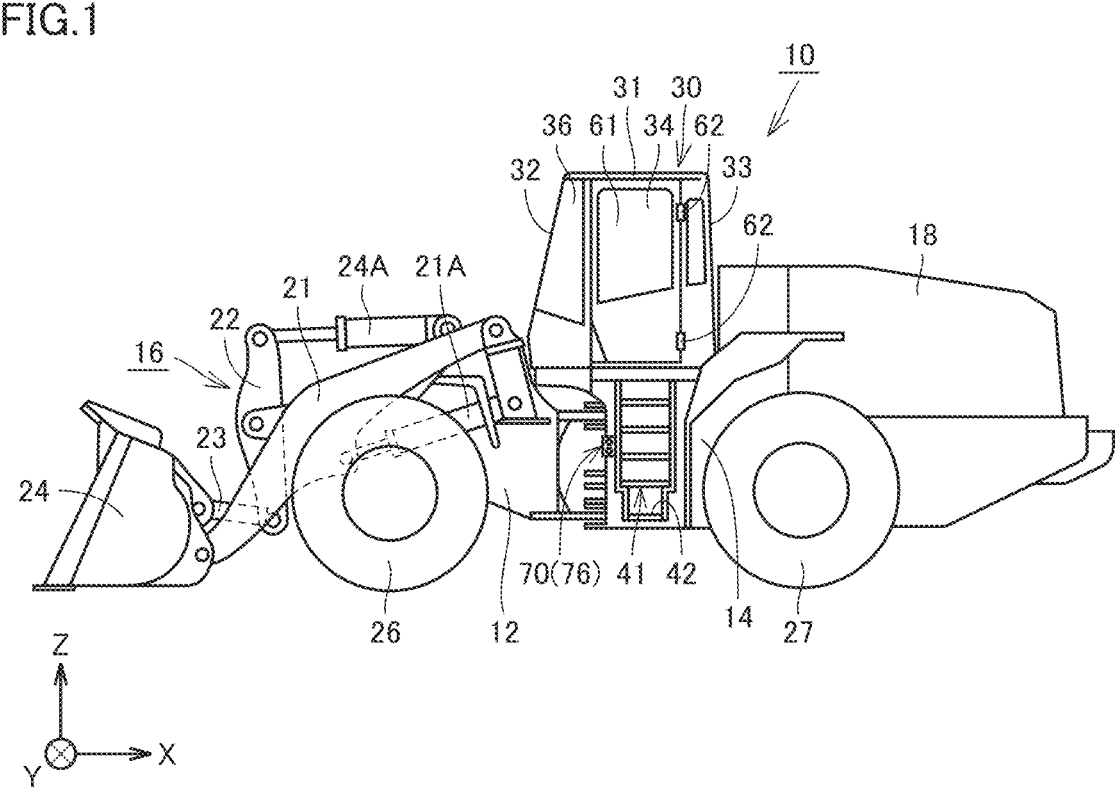
FIG. 1 is a side view illustrating a wheel loader according to an embodiment of the present disclosure.

Hereinafter, embodiments will be described with reference to the drawings. In the following description, the same components will be denoted by the same reference numerals, and may have the same names and the same functions, and thereby, the detailed description thereof will not be repeated.

[Overall Configuration]

In the present embodiment, the configuration of a wheel loader which serves as an example of a work machine to which the idea of the present disclosure may be applied will be described firstly. FIG. 1 is a side view illustrating a wheel loader 10 according to an embodiment of the present disclosure.

As illustrated in FIG. 1, the wheel loader 10 includes a front frame 12, a rear frame 14, front wheels 26, rear wheels 27, a work implement 16, a cab (an operator's compartment) 30, and a rear structure 18.

In the following description, the direction in which the wheel loader 10 travels straight is defined as a front-rear direction of the wheel loader 10. In the front-rear direction of the wheel loader 10, the side on which the work implement 16 is disposed relative to the front frame 12 and the rear frame 14 is defined as a front side, and the side opposite to the front side is defined as a rear side. The left-right direction of the wheel loader 10 is defined as a direction orthogonal to the front-rear direction in planar view. The right side and the left side in the left-right direction when viewed from the front direction correspond to the right direction and the left direction, respectively. The vertical direction of the wheel loader 10 is defined as a direction orthogonal to a plane defined by the front-rear direction and the left-right direction. In the vertical direction, the side downward the ground is defined as a lower side, and the side upward the sky is defined as an upper side.

The front-rear direction corresponds to the front-rear direction of the operator sitting on a driver's seat in the cab 30. The left-right direction corresponds to the left-right direction of the operator sitting on the driver's seat. The left-right direction corresponds to the width direction of the wheel loader 10. The vertical direction corresponds to the vertical direction of the operator sitting on the driver's seat. The direction facing the operator sitting on the driver's seat corresponds to the front direction, and the direction behind the operator sitting on the driver's seat corresponds to the rear direction. The right side and the left side when the operator is sitting on the driver's seat and facing toward the front correspond to the right direction and the left direction, respectively. The side down to the feet of the operator sitting on the driver's seat corresponds to the lower side, and the side upper to the head corresponds to the upper side.

The front frame 12 and the rear frame 14 constitute an articulate body frame. The front frame 12 is provided in front of the rear frame 14. The front frame 12 is rotatably coupled to the rear frame 14 by a center pin (not shown). The center of rotation of the front frame 12 relative to the rear frame 14 corresponds to an axis extending in the vertical direction.

The front frame 12 is coupled to the rear frame 14 via steering cylinders (not shown). The steering cylinders are provided in pairs on the left side and the right side, respectively. The front frame 12 rotates to the left side or to the right side about the center pin as one steering cylinder extends and the other steering cylinder contracts or vice versa.

The front wheels 26 and the rear wheels 27 are travelling wheels of the wheel loader 10. The front wheels 26 are provided on the front frame 12. The front wheels 26 are provided in pairs on the left side and the right side, respectively. The rear wheels 27 are provided on the rear frame 14. The rear wheels 27 are provided in pairs on the left side and the right side, respectively.

The work implement 16 is provided on the front frame 12. The work implement 16 includes a boom 21, a bucket 24, a boom cylinder 21A, a bell crank 22, a bucket cylinder 24A, and a link 23.

The cab 30 and the rear structure 18 are provided on the rear frame 14. The cab 30 is provided behind the work implement 16. The operator enters the room of the cab 30 and operates the wheel loader 10. The operator gets into the cab 30 so as to drive the wheel loader 10 and operate the work implement 16.

The rear structure 18 is provided behind the cab 30. The rear structure 18 includes a hydraulic oil tank, an engine, a hydraulic pump, and the like. The front frame 12, the rear frame 14 and the rear structure 18 constitute the body of the wheel loader 10.

[Configuration of Cab 30]

Next, the configuration of the cab 30 will be described. The cab 30 includes a cab body 31. The cab body 31 defines an interior space of the cab 30. The cab body 31 is formed by assembling steel plates and transparent windows in combination.

The cab body 31 has a hexagonal shape in top view. The cab body 31 includes a front surface 32, a rear surface 33, a left surface 34, a right surface, a diagonally left front surface 36, and a diagonally right front surface.

The front surface 32 is provided facing forward. The rear surface 33 is provided facing rearward. The length of the front surface 32 in the left-right direction is shorter than the length of the rear surface 33 in the left-right direction. The right surface is provided facing rightward. The right surface is disposed between the front surface 32 and the rear surface 33. The right surface is continuous with the right end of the rear surface 33. The left surface 34 is provided facing leftward. The left surface 34 is disposed between the front surface 32 and the rear surface 33. The left surface 34 is continuous with the left end of the rear surface 33.

The diagonally left front surface 36 is provided facing diagonally left forward. The diagonally left front surface 36 is disposed between the front surface 32 and the left surface 34. The diagonally left front surface 36 is continuous with the left end of the front surface 32 and the front end of the left surface 34. The diagonally right front surface is provided facing diagonally right forward. The diagonally right front surface is disposed between the front surface 32 and the right surface. The diagonally right front surface is continuous with the right end of the front surface 32 and the front end of the right surface. The distance between the diagonally left front surface 36 and the diagonally right front surface in the left-right direction decreases from the rear side toward the front side.

The cab body 31 of the cab 30 is not limited to the hexagonal shape in top view as described above, and it may have, for example, a rectangular shape in top view.

The cab 30 includes a left door 61 and a right door. Both the left door 61 and the right door are provided on the cab body 31 so that they may be opened or closed as necessary. The left door 61 is provided on the left side of the cab body 31. The door 61 is provided on the left surface 34. The door 61 is an automatic door that may be opened and closed automatically. The right door is provided on the right side of the cab body 31. The right door is provided on the right surface. The right door is a manual door that may be opened and closed manually.

[Configuration of Door 61]

Next, the configuration of the door 61 and the configuration around the door 61 will be described.

The cab body 31 is formed with a doorway. The doorway is an entrance provided in the cab body 31 for the operator to get in and out of the cab 30. The doorway has a rectangular shape as a whole in which the vertical direction corresponds to the longitudinal direction. The doorway is provided on the left surface 34 and the right surface, respectively.

The door 61 is provided for the doorway which is provided on the left surface 34. The door 61 may be rotated between a closed position (a position illustrated in FIG. 1 and FIGS. 2 and 3 to be described later) in which the doorway is closed and an open position (a position illustrated in FIG. 8 to be described later) in which the doorway is opened. The door 61 is configured to open and close the doorway.

The door 61 includes a hinge 62. The door 61 is rotatably supported on the cab body 31 via the hinge 62. The door 61 is configured to be rotatable around the hinge 62 between the closed position and the open position. The door 61 is configured to open outward from the cab 30. The door 61 is a rear hinge door in which the hinge 62 is arranged at the rear side of the doorway.

The rotation angle of the door 61 from the closed position to the open position is greater than 90°. Preferably, the rotation angle of the door 61 from the closed position to the open position is 120° or more.

When the door 61 is at the closed position, the door 61 is parallel to the left surface 34. When the door 61 is at the open position, the door 61 extends diagonally left rearward from the rear end of the opening formed by the doorway. The door 61 at the open position is located rearward than the doorway.

The wheel loader 10 further includes a ladder 41. The cab 30 is arranged above the ladder 41. The ladder 41 is used by the operator to move up and down between the ground and the cab 30.

The ladder 41 is attached to the rear frame 14. The ladder 41 includes a plurality of steps 42. Each step 42 serves as a foothold on which the operator steps. The plurality of steps 42 are arranged at an interval in the vertical direction.

Figure 2:
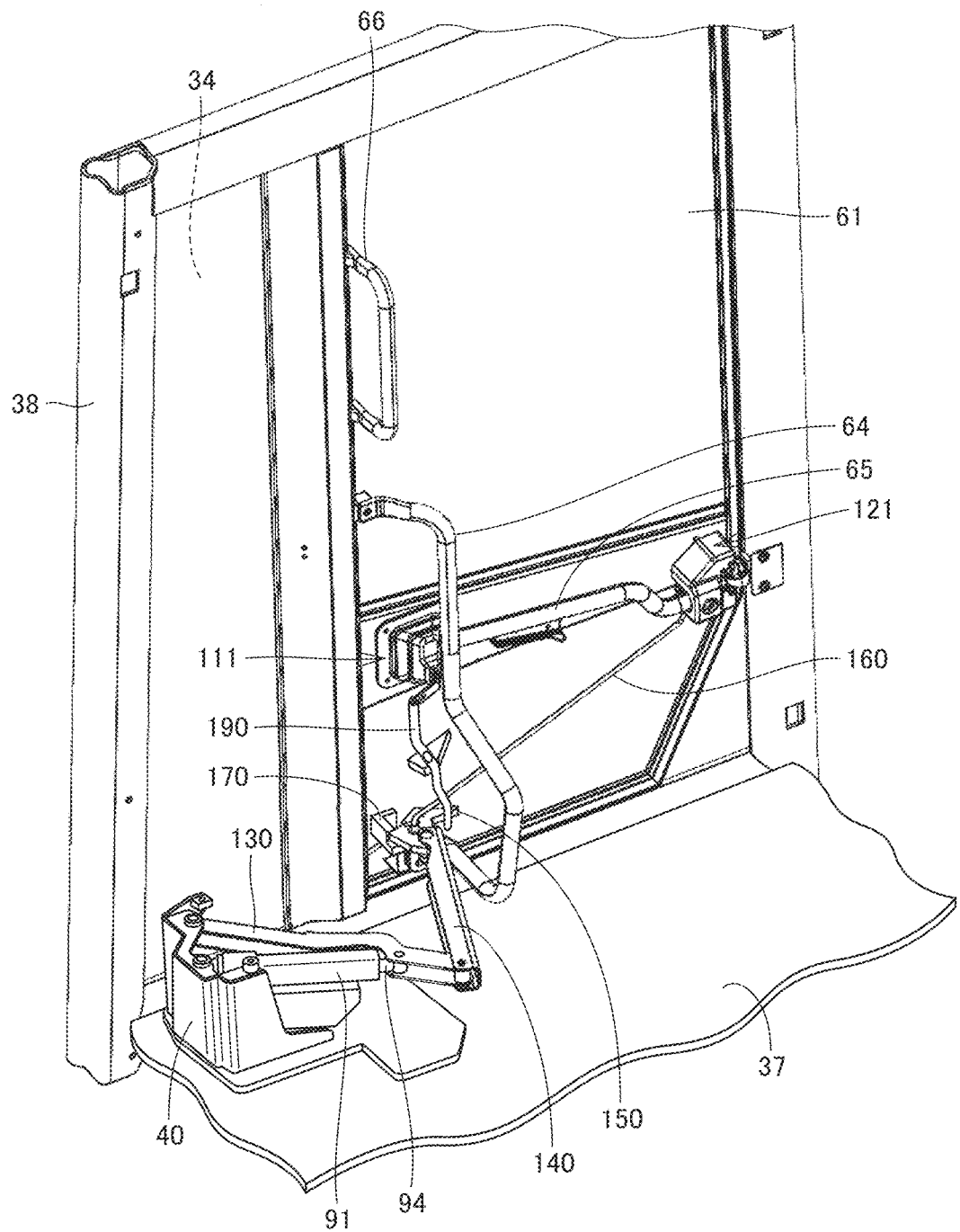
FIG. 2 is a perspective view illustrating a door at a closed position when viewed from the inside of a cab.

FIG. 2 is a perspective view illustrating the door 61 at the closed position when viewed from the inside of the cab 30. As illustrated in FIGS. 1 and 2, the wheel loader 10 further includes a handrail 64, a handrail 65, and a handrail 66.

The handrail 64, the handrail 65 and the handrail 66 are used by the operator as handrails to move up and down between the ground and the cab 30 or get in and out of the cab 30. The handrail 64, the handrail 65 and the handrail 66 each is in the form of a bar that may be gripped by the operator.

The handrail 64, the handrail 65 and the handrail 66 are attached to the door 61. The handrail 64, the handrail 65 and the handrail 66 are provided on an indoor surface of the door 61 that is located inside the cab 30 when the door 61 is at the closed position. The handrail 64 and the handrail 66 are adjacent to the rear end of the doorway in the front-rear direction. The handrail 64 and the handrail 66 extend in the vertical direction. The handrail 65 extends in the horizontal direction. When the door 61 is at the open position, the handrail 64, the handrail 65 and the handrail 66 are located outside the cab 30.

[Configuration of Opening/Closing Device for Door 61]

Figure 3:
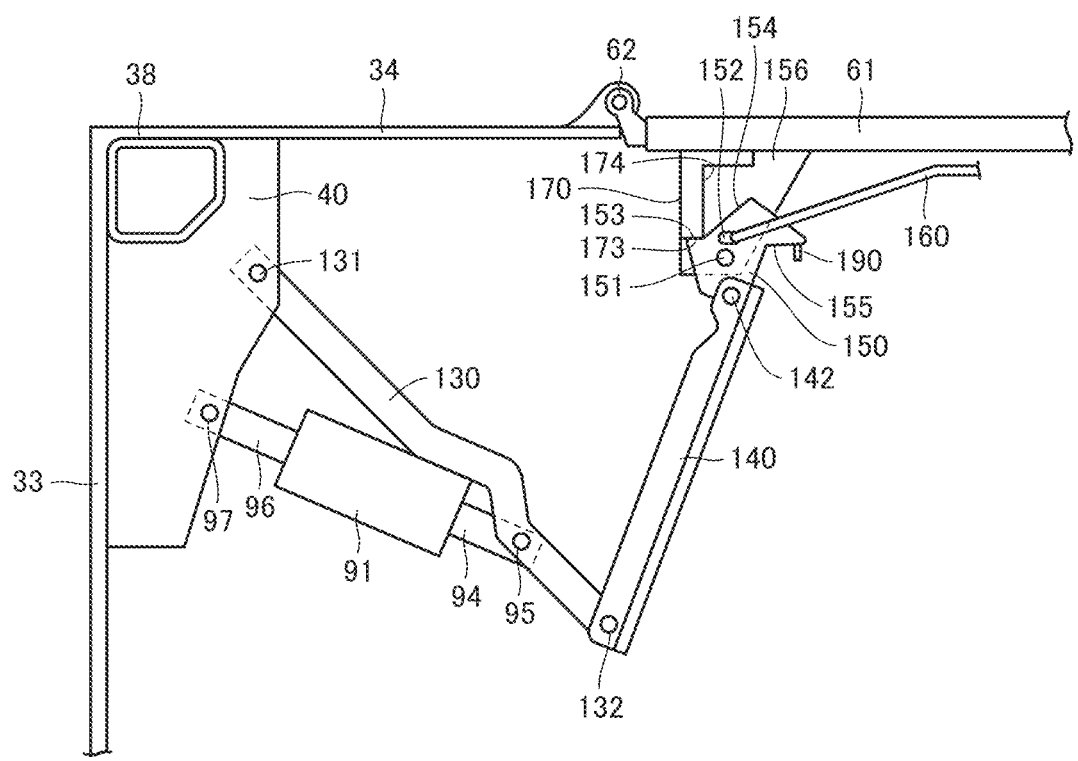
FIG. 3 is a planar view schematically illustrating the configuration of an opening/closing device for the door.

Next, the configuration of a device automatically opening and closing the door 61 will be described. FIG. 3 is a planar view schematically illustrating the configuration of an opening and closing device for the door 61.

As illustrated in FIGS. 2 and 3, the wheel loader 10 further includes an actuator 91. The actuator 91 generates a driving force to move the closed door 61 in the opening direction. The actuator 91 performs an opening operation on the door 61. The opening operation refers to such an operation that the door 61 is moved from the closed position to the open position. The actuator 91 further generates a driving force to move the opened door 61 in the closing direction. The actuator 91 performs a closing operation on the door 61. The closing operation refers to such an operation that the door 61 is moved from the open position to the closed position.

The actuator 91 is a linear actuator, and includes a rod 94 and a support 96. The rod 94 can do reciprocating motion, and the length of the rod 94 protruding from the actuator 91 is extendable. The actuator 91 is supported on the cab body 31 via the support 96. As illustrated in FIG. 2, a bracket 40 is fixed on a floor 37 of the cab body 31. A coupling pin 97 is inserted through a through hole formed in the bracket 40 to fix the support 96. Thus, the support 96 (the actuator 91) is fixed to the cab body 31 in such a manner that it is rotatable about the coupling pin 97.

As illustrated in FIG. 1, the wheel loader 10 further includes an operation unit 70. The operation unit 70 is operated by the operator when the operator opens or closes the door 61. The operation unit 70 includes, for example, a push button to be pressed by the operator. The operation unit 70 may include an open button for opening the door 61 and a close button for closing the door 61.

The operation unit 70 includes a first operation unit (not shown) provided inside the cab 30 and a second operation unit 76 provided outside the cab 30. The first operation unit is used by the operator to open or close the door 61 from the inside of the cab 30. The first operation unit is attached to, for example, a right front pillar of the cab 30. The second operation unit 76 is used by the operator to open or close the door 61 from the outside of the cab 30. The second operation unit 76 is attached to the ladder 41.

The wheel loader 10 further includes a power transmission device that transmits a driving force generated by the actuator 91 to the door 61. The power transmission device includes a first link 130, a second link 140, a third link 150, and a contact member 170.

The first link 130 and the second link 140 each is in the form of a rod. Similar to the support 96 of the actuator 91, the base end of the first link 130 is rotatably attached to the bracket 40 by a coupling pin 131. The base end of the first link 130 is supported on the cab body 31. The coupling pin 131 couples the first link 130 to the bracket 40, and is detachable from the bracket 40 and the first link 130.

The distal end of the first link 130 is coupled to the base end of the second link 140 by a coupling pin 132 in such a manner that they are rotatable relative to each other. The coupling pin 132 couples the first link 130 to the second link 140, and is detachable from the first link 130 and the second link 140. The rod 94 of the actuator 91 is coupled to a position between the base end and the distal end of the first link 130 by a coupling pin 95 in such a manner that they are rotatable relative to each other.

The third link 150 is in the form of a plate. A link fixing bracket 156 is provided on an indoor surface of the door 61. A shaft 151 extending in the vertical direction is attached to the link fixing bracket 156. The third link 150 is configured to be rotatable relative to the cab body 31 and rotatable relative to the door 61 about the shaft 151.

The third link 150 is provided with a first contact portion 153, a second contact portion 154, and an abutment portion 155 on its peripheral edge. The first contact portion 153, the second contact portion 154, and the abutment portion 155 each constitutes a part of the peripheral edge of the third link 150. The first contact portion 153 and the second contact portion 154 are provided at different positions.

The distal end of the second link 140 is coupled to the third link 150 by a coupling pin 142 in such a manner that they are rotatable relative to each other. The coupling pin 142 couples the second link 140 to the third link 150, and is detachable from the second link 140 and the third link 150.

The third link 150 is provided with a slot 152. One end of a locking link 160 in the form of a cable is engaged in the slot 152. The locking link 160 is movable in the slot 152 along the extending direction of the slot 152.

The contact member 170 is fixed to the indoor surface of the door 61, and is integral with the door 61. The first contact portion 153 and the second contact portion 154 of the peripheral edge of the third link 150 can selectively contact the contact member 170. The contact member 170 has a first contact surface 173 and a second contact surface 174. When the door 61 illustrated in FIGS. 1 to 3 is at the closed position, the first contact portion 153 of the third link 150 comes into contact with the first contact surface 173 of the contact member 170. When the door 61 is at the closed position, the second contact portion 154 of the third link 150 is away from the second contact surface 174 of the contact member 170 without contacting the second contact surface 174.

When the second contact portion 154 of the third link 150 comes into contact with the second contact surface 174 of the contact member 170, a driving force for opening the door 61 is transmitted to the door 61. When the first contact portion 153 of the third link 150 comes into contact with the first contact surface 173 of the contact member 170, a driving force for closing the door 61 is transmitted to the door 61.

As illustrated in FIG. 2, the wheel loader 10 further includes an open position locking unit 111 and a closed position locking unit 121. The closed position locking unit 121 is configured to lock the door 61 at the closed position. The open position locking unit 111 is configured to lock the door 61 at the open position.

Figure 4:
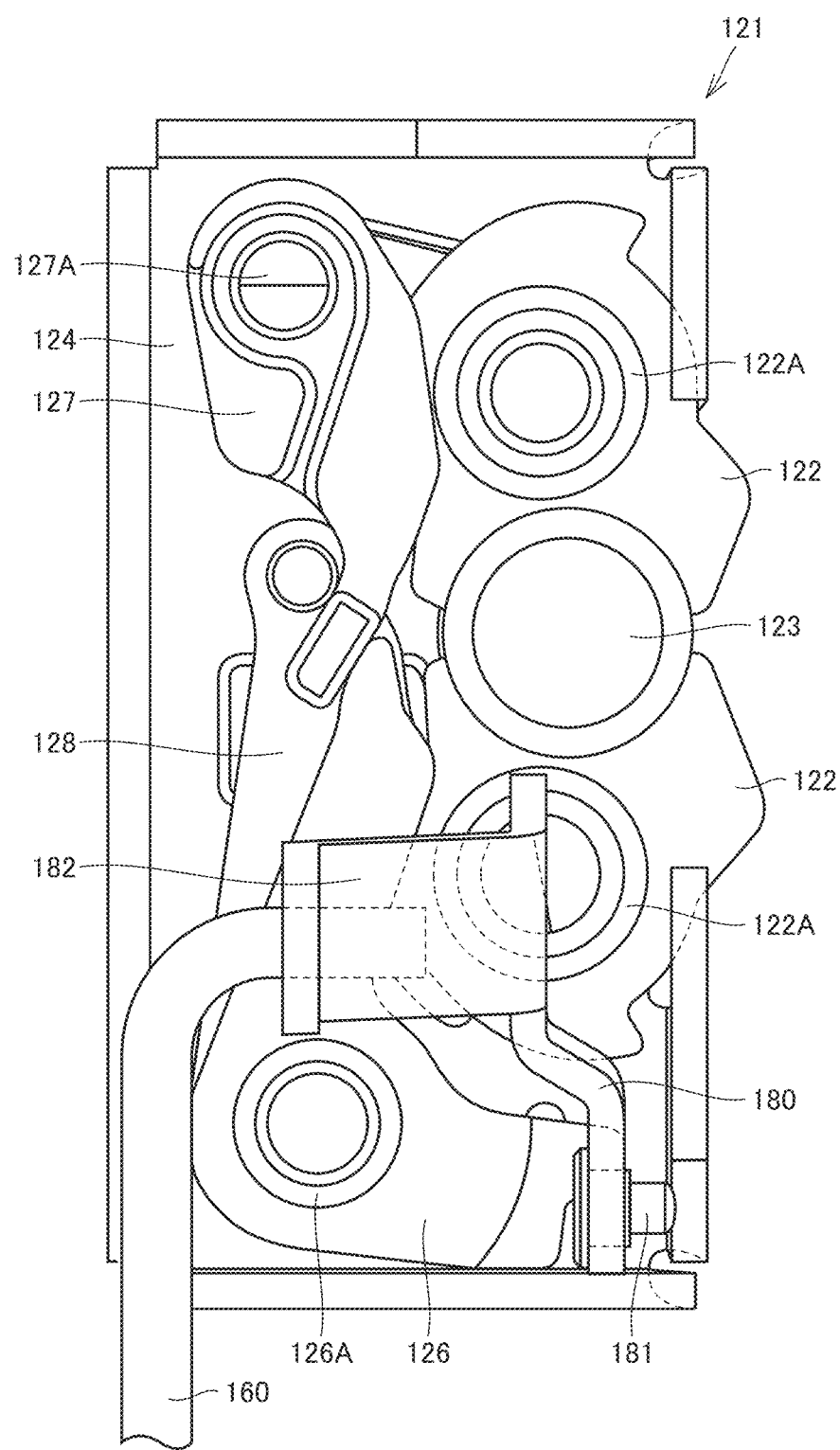
FIG. 4 is an enlarged view schematically illustrating the configuration of a closed position locking unit.

The closed position locking unit 121 is provided inside the cab 30. FIG. 4 is an enlarged view schematically illustrating the configuration of the closed position locking unit 121.

The closed position locking unit 121 includes a pair of movable catchers 122 and a striker 123 that may be engaged with the catchers 122. A catcher support 124 that supports the catchers 122 is provided on the indoor surface of the door 61. The striker 123 is attached to the left front pillar of the cab 30. A support shaft 122A is attached to the catcher support 124. The support shaft 122A rotatably supports the catcher 122 on the catcher support 124.

The catcher support 124 is disposed with an arm 180. The arm 180 has a rotation shaft 181, and the rotation shaft 181 is fixed to the catcher support 124. The arm 180 is rotatable relative to the catcher support 124 about the rotation shaft 181. The arm 180 includes an engaging portion 182. The engaging portion 182 is engaged with the other end of the locking link 160.

The closed position locking unit 121 further includes link members 126, 127 and 128. The catcher support 124 is disposed with support shafts 126A and 127A. The link member 126 is supported on the catcher support 124 so as to be rotatable about the support shaft 126A. The link member 127 is supported on the catcher support 124 so as to be rotatable about the support shaft 127A. The locking link 160 is engaged with the catchers 122 of the closed position locking unit 121 via the arm 180 and the link members 126, 127 and 128.

In the closed position locking unit 121 illustrated in FIG. 4, a pair of catchers 122 are arranged to substantially surround the striker 123 from opposing sides. The striker 123 is engaged with the pair of catchers 122 such that the striker 123 cannot move relative to the catcher 122. As a result, the door 61 is locked at the closed position so that it cannot be rotated relative to the cab body 31 (locking operation).

The first link 130, the second link 140, the third link 150 and the locking link 160 constitute a locking link device that couples the actuator 91 to the closed position locking unit 121.

The open position locking unit 111 is provided on the indoor surface of the door 61. Similar to the closed position locking unit 121, the open position locking unit 111 includes a movable latch and a striker that may be engaged with the latch. The details of the open position locking unit 111 will be described later.

As illustrated in FIGS. 2 and 3, a locking link 190 is provided on the indoor surface of the door 61. One end of the locking link 190 is engaged with the third link 150 (more specifically, abuts against the abutment portion 155) or disengaged from the third link 150 as the third link 150 rotates about the shaft 151. The locking link 190 illustrated in FIG. 3 is in contact with the abutment portion 155, and is engaged with the third link 150.

[Opening Operation on Door 61]

Figure 5:
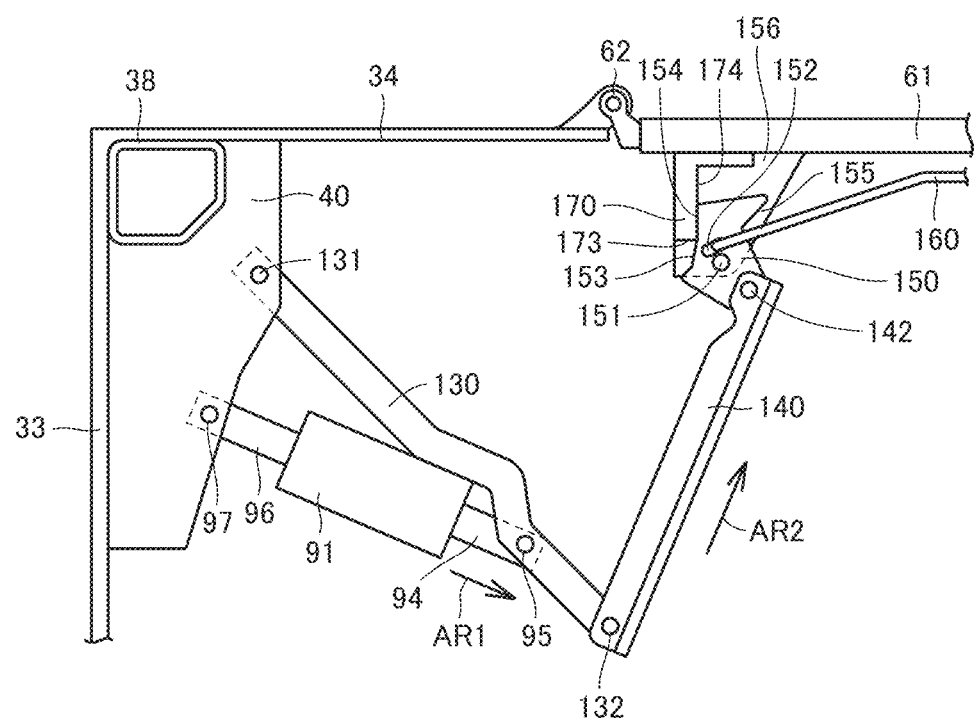
FIG. 5 is a planar view illustrating a state where an opening operation of the door is started.

Next, the opening operation on the door 61 will be described. FIG. 5 is a planar view illustrating a state when the opening operation of the door 61 is started. When the operator operates the operation unit 70, for example, by pressing the open button of the first operation unit provided inside the cab 30, the rod 94 of the actuator 91 moves in the direction indicated by an arrow AR1 as illustrated in FIG. 5. As the rod 94 of the actuator 91 extends, the first link 130 is forced to rotate counterclockwise about the coupling pin 131. Due to the rotation of the first link 130, the second link 140 is forced to move in the direction indicated by an arrow AR2 toward the outside of the cab 30.

Figure 6:
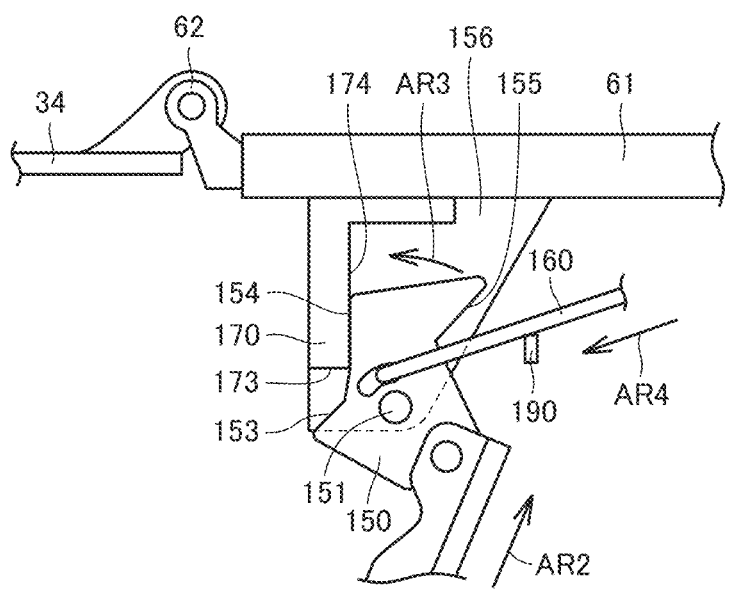
FIG. 6 is an enlarged planar view illustrating the vicinity of a third link illustrated in FIG. 5.

FIG. 6 is an enlarged planar view illustrating the vicinity of the third link 150 illustrated in FIG. 5. Due to the rotation of the second link 140, the third link 150 is forced to rotate counterclockwise about the shaft 151 so as to move in the direction indicated by an arrow AR3. Thus, the third link 150 is forced to rotate by the driving force from the actuator 91 via the first link 130 and the second link 140. The slot 152 formed in the third link 150 moves in the direction indicated by the arrow AR3, and thereby, the locking link 160 engaged with the slot 152 is pulled by the third link 150 to move in the direction indicated by an arrow AR4.

Due to the rotation of the third link 150, the locking link 190 illustrated in FIG. 6 moves away from the third link 150, and becomes disengaged from the third link 150. The other end of the locking link 190 is coupled to the latch of the open position locking unit 111, which will be described later in detail.

Figure 7:
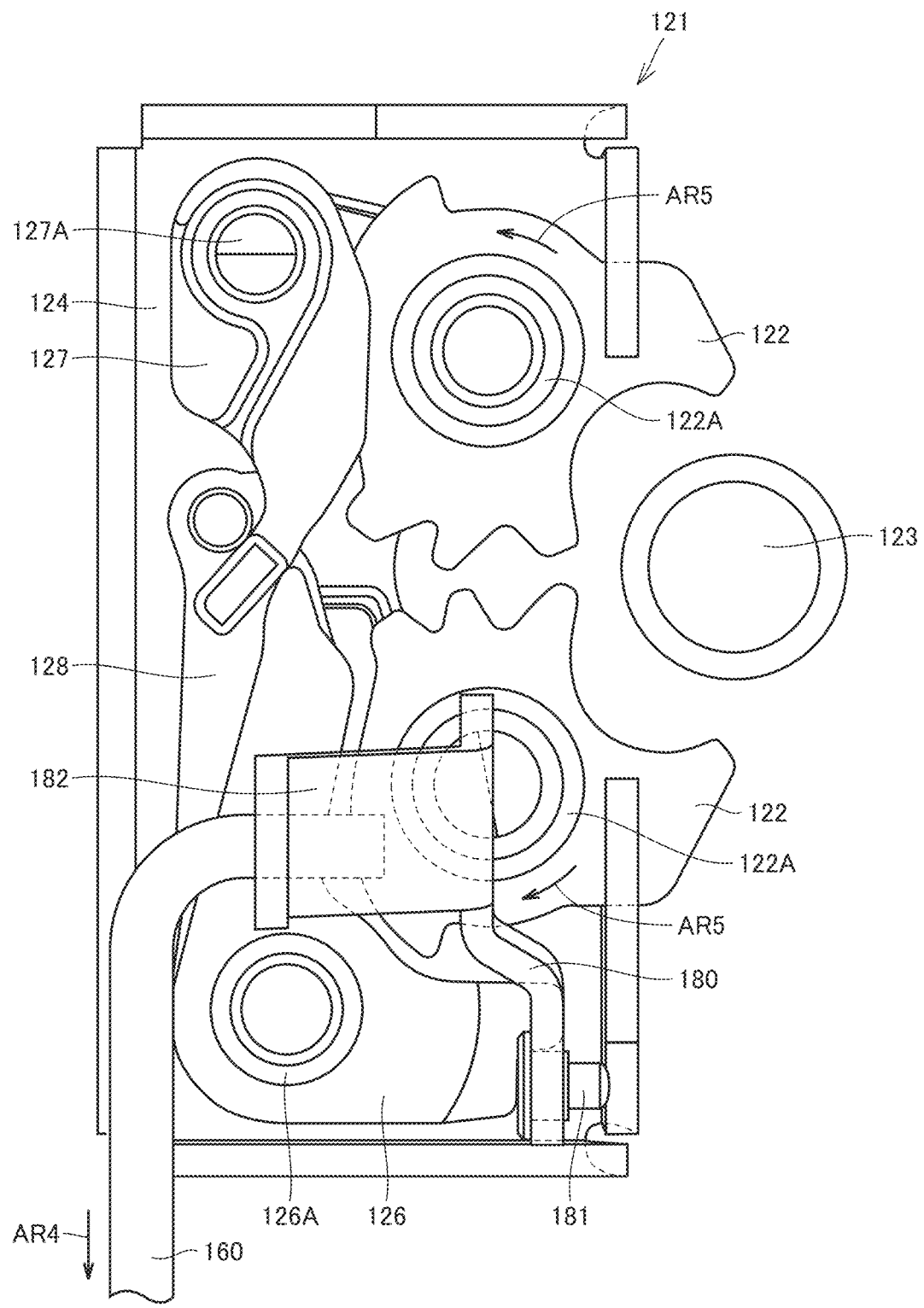
FIG. 7 is an enlarged view illustrating a state where the closed position locking unit is released.

FIG. 7 is an enlarged view illustrating a state where the closed position locking unit 121 is released. When pulled by the locking link 160 which is moved in the direction indicated by the arrow AR4, the arm 180 rotates about the rotation shaft 181. The movement of the arm 180 is transmitted to the catcher 122 via the link members 126, 127 and 128 to move the catchers 122 of the closed position locking unit 121. The catchers 122 are moved to a position without surrounding the striker 123 by rotating about the support shaft 122A in the direction indicated by an arrow AR5. The striker 123 is disengaged from the catcher 122 and can move relative to the catchers 122. Thus, the door 61 is released from the closed position (unlocking operation).

When the driving force of the actuator 91 is transmitted to the catchers 122 via the locking link 160, the catchers 122 are disengaged from the striker 123, and thereby, the door 61 that is locked by the closed position locking unit 121 is released. The driving force to unlock the door 61 that is locked by the closed position locking unit 121 is generated by the actuator 91.

Returning to FIG. 6, due to the rotation of the third link 150, the first contact portion 153 of the third link 150 is disengaged from the first contact surface 173 of the contact member 170, and the second contact portion 154 of the third link 150 comes into contact with the second contact surface 174 of the contact member 170. The third link 150 is positioned relative to the contact member 170, and at this time, the driving force of the actuator 91 for opening the door 61 may be transmitted to the door 61.

Figure 8:
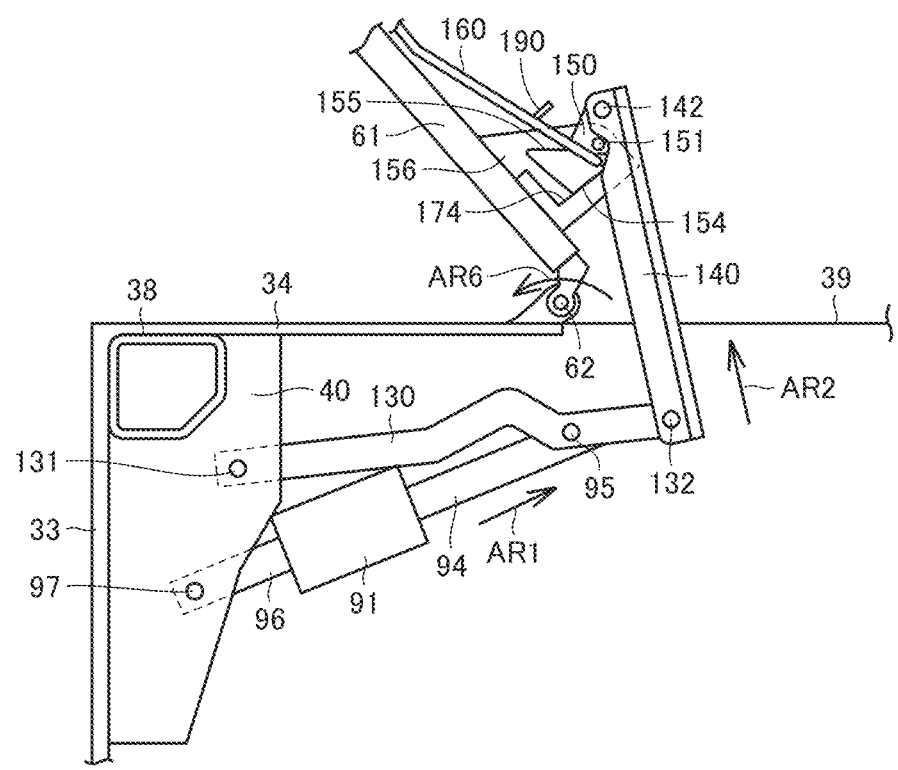
FIG. 8 is a planar view illustrating the door at an open position.

FIG. 8 is a planar view illustrating the door 61 at the open position. After the closed position locking unit 121 is released, the rod 94 of the actuator 91 continues to extend so as to move the second link 140 in the direction indicated by the arrow AR2, and thereby, the driving force of the actuator 91 is transmitted to the door 61 via the first link 130, second link 140 and the third link 150. Thus, the door 61 is forced by the driving force to rotate counterclockwise around the hinge 62 in the direction indicated by an arrow AR6. Thereby, the door 61 is moved to the open position. The actuator 91 generates a driving force to open the door 61. FIG. 8 illustrates that the doorway 39 is open. When the door 61 is at the open position, the actuator 91 is completely located inside the cab body 31 without being exposed outside the cab 30.

Figure 9:
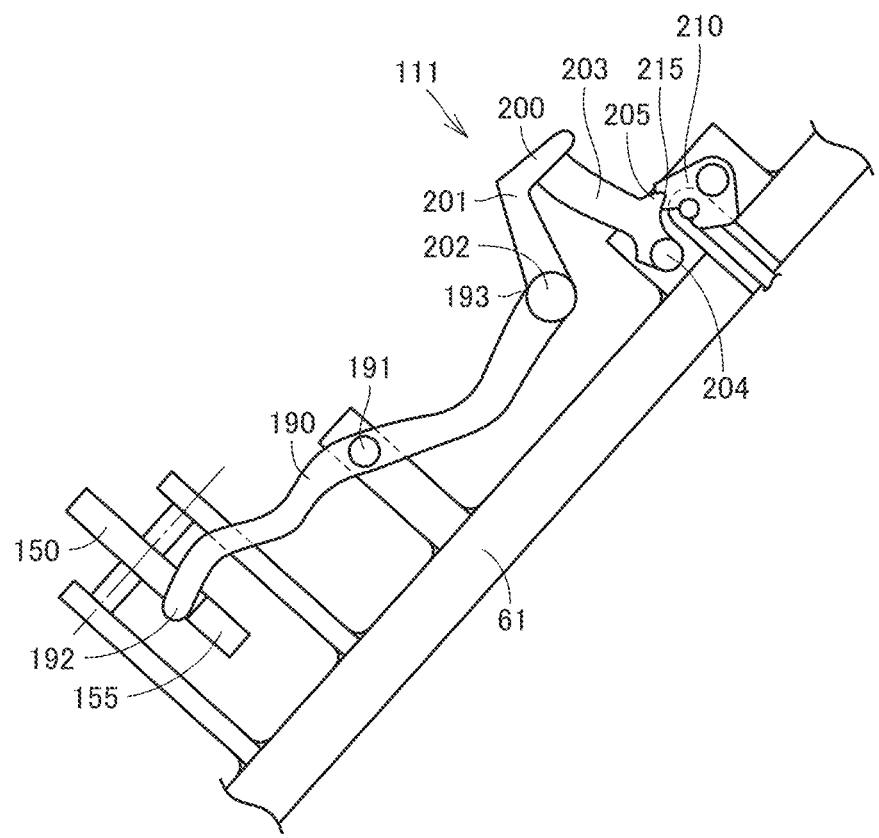
FIG. 9 is an enlarged view schematically illustrating the configuration of an open position locking unit.

FIG. 9 is an enlarged view schematically illustrating the configuration of the open position locking unit 111. As illustrated in FIG. 9, the locking link 190 is rotatable relative to the door 61 about a rotation shaft 191. One end 192 of the locking link 190 faces the abutment portion 155 of the third link 150. The other end 193 of the locking link 190 is coupled to a latch member 200.

The open position locking unit 111 includes the latch member 200 and a striker 210. The latch member 200 has a first arm 201 and a second arm 203. A coupling shaft 202 is provided at a tip end of the first arm 201. The other end 193 of the locking link 190 is coupled to the coupling shaft 202. The locking link 190 is coupled to the latch member 200 in such a manner that they are rotatable relative to each other. A rotation shaft 204 is provided at a tip end of the second arm 203. The latch member 200 is rotatable relative to the door 61 about the rotation shaft 204. The second arm 203 has an engaging portion 205.

The striker 210 is provided with an engaging portion 215. The engaging portion 205 of the latch member 200 illustrated in FIG. 9 is engaged with the engaging portion 215 of the striker 210. Thus, the door 61 is locked at the open position so that it cannot rotate relative to the cab body 31 (locking operation).

The first link 130, the second link 140, the third link 150, and the locking link 190 constitute a locking link device that couples the actuator 91 with the open position locking unit 111.

[Closing Operation on Door 61]

Figure 10:
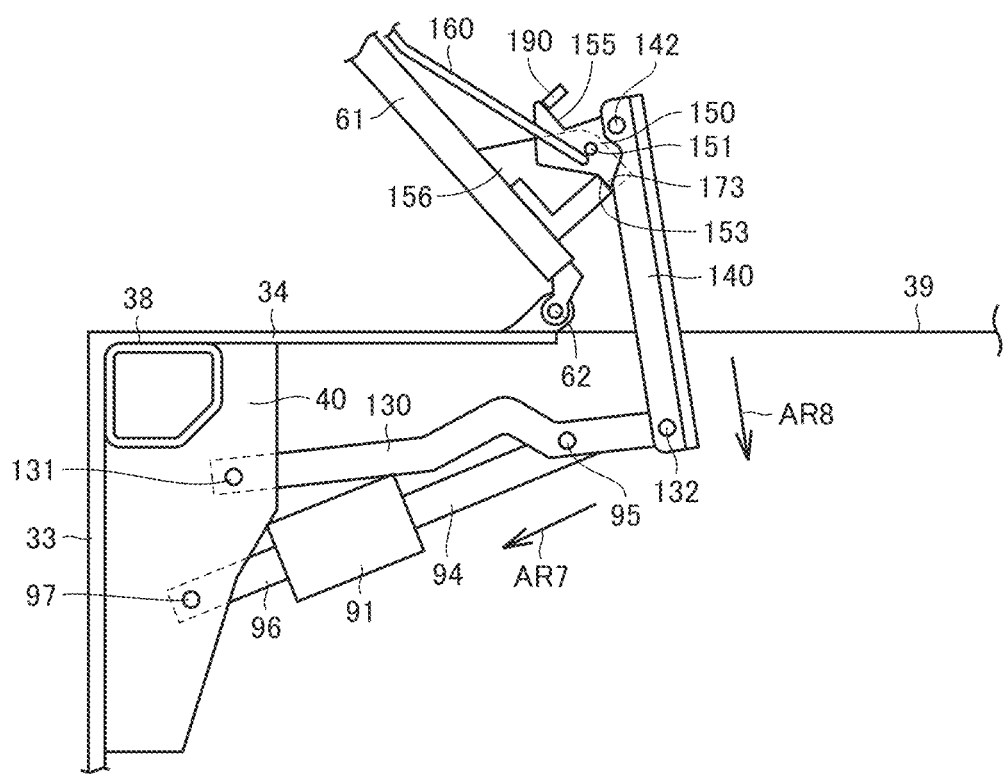
FIG. 10 is a planar view illustrating a state where a closing operation of the door is started.

Next, the closing operation on the door 61 will be described. FIG. 10 is a planar view illustrating a state when the closing operation of the door 61 is started. When the operator operates the operation unit 70, for example, by pressing the close button of the first operation unit provided inside the cab 30, as illustrated in FIG. 10, the rod 94 of the actuator 91 moves in the direction indicated by an arrow AR7. As the length of the rod 94 is decreased, the first link 130 is forced to rotate clockwise about the coupling pin 131. Due to the rotation of the first link 130, the second link 140 is forced to move in the direction indicated by an arrow AR8 toward the inside of the cab 30.

Figure 11:
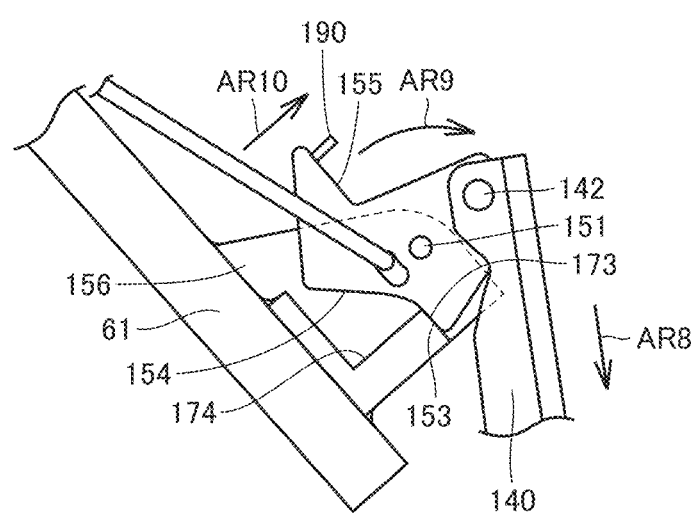
FIG. 11 is an enlarged planar view illustrating the vicinity of a third link illustrated in FIG. 10.

FIG. 11 is an enlarged planar view illustrating the vicinity of the third link 150 illustrated in FIG. 10. Due to the rotation of the second link 140, the third link 150 is pulled and forced to rotate clockwise about the shaft 151 so as to move in the direction indicated by an arrow AR9. Thus, the third link 150 is forced to rotate by the driving force from the actuator 91 via the first link 130 and the second link 140. After the abutment portion 155 of the third link 150 is moved, the locking link 190 comes into contact with the abutment portion 155. Thus, the locking link 190 is pushed by the abutment portion 155 to move in the direction indicated by an arrow AR10.

Due to the rotation of the third link 150, the second contact portion 154 of the third link 150 is disengaged from the second contact surface 174 of the contact member 170, and the first contact portion 153 of the third link 150 comes into contact with the first contact surface 173. The third link 150 is positioned relative to the contact member 170, and at this time, the driving force of the actuator 91 for closing the door 61 may be transmitted to the door 61.

Figure 12:
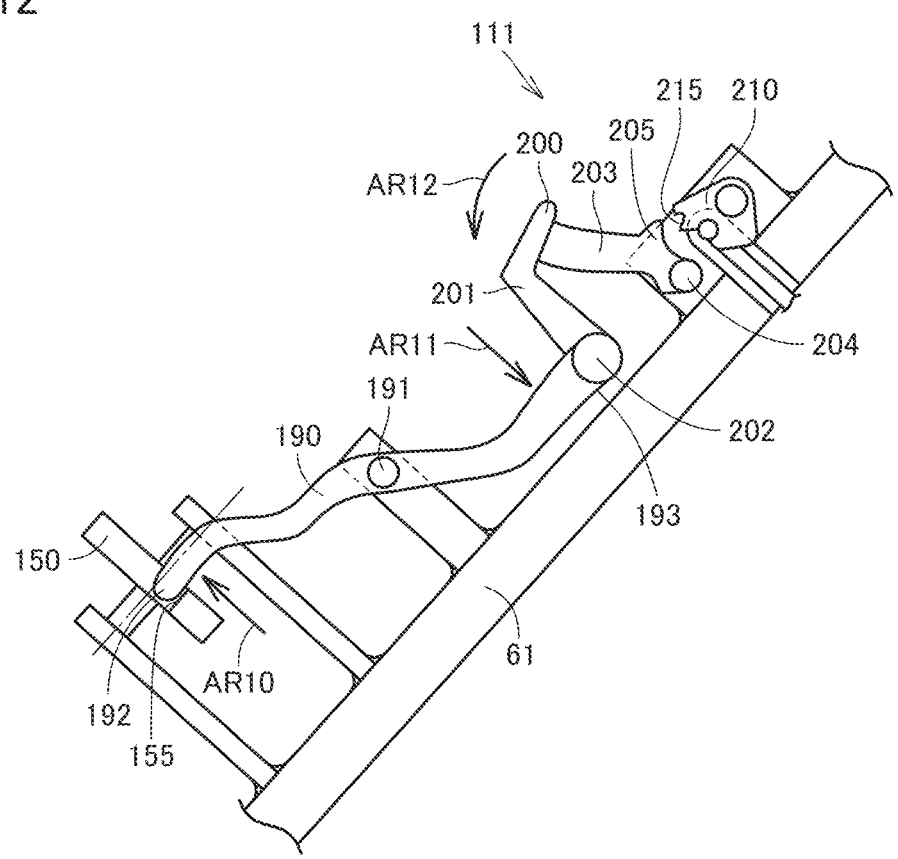
FIG. 12 is an enlarged view illustrating a state in which the open position locking unit is released.

FIG. 12 is an enlarged view illustrating a state where the open position locking unit 111 is released. When one end 192 of the locking link 190 is moved away from the door 61 in the direction indicated by the arrow AR10, the locking link 190 as a whole is forced to rotate clockwise about the rotation shaft 191. The other end 193 of the locking link 190 is moved closer to the door 61 in the direction indicated by an arrow AR11. Due to the movement of the locking link 190, the latch member 200 coupled to the locking link 190 by the coupling shaft 202 is forced to rotate counterclockwise about the rotation shaft 204 in the direction indicated by an arrow AR12. As a result, the engaging portion 205 of the latch member 200 is disengaged from the engaging portion 215 of the striker 210. When the engaging portion 205 and the engaging portion 215 are disengaged, the door 61 is released from the open position (unlocking operation).

When the driving force of the actuator 91 is transmitted to the latch member 200 via the locking link 190, the latch member 200 is disengaged from the striker 210, and thereby, the door 61 that is locked by the open position locking unit 111 is released. The driving force to unlock the door 61 that is locked by the open position locking unit 111 is generated by the actuator 91.

After the open position locking unit 111 is released, the actuator 91 continues to decrease the length of the rod 94 so as to move the second link 140 in the direction indicated by the arrow AR8, and thereby, the driving force of the actuator 91 is transmitted to the door 61 via the first link 130, the second link 140 and the third link 150. Thus, the door 61 is forced by the driving force to rotate clockwise about the hinge 62 to the closed position illustrated in FIGS. 2 and 3. The driving force for closing the door 61 is generated by the actuator 91.

[Function and Effects]

Next, the function and effects of the present embodiment will be described.

As illustrated in FIGS. 2 and 3, in the cab 30 according to the present embodiment, the actuator 91 is attached to the cab body 31 and is supported on the cab body 31. By supporting the actuator 91 on the cab body 31 which is subjected to less vibration than the door 61, it is possible to prevent the actuator 91 from being damaged by the vibration.

In order to allow the operator who is seated in the cab 30 to have a clear view on the outside of the cab 30, the door 61 of the cab 30 for the work machine is mostly made of a transparent material such as glass. By supporting the actuator 91 on the cab body 31 instead of the door 61, it is possible to prevent the operator's view from being obstructed by the actuator 91, which makes it possible to provide a clear view to the operator.

Since the cab 30 for the work machine is required to be hermetically sealed, a relatively hard door seal is used in the cab 30. In order to elastically deform the relatively hard door seal so as to close the door 61, the actuator 91 is required to generate a larger driving force, which may consequently make the actuator 91 heavier. By supporting the heavier actuator 91 on the cab body 31 instead of the door 61, it is possible to firmly support the actuator 91.

As illustrated in FIGS. 5 to 7, the actuator 91 generates a driving force to unlock the door 61. As illustrated in FIG. 8, the actuator 91 further generates a driving force to open and close the door 61. Thus, a single actuator 91 may be used as the driving source to unlock the door 61 and open or close the door 61. Since the actuator 91 can realize a plurality of functions, it is possible to simplify the configuration of the cab 30.

As illustrated in FIGS. 3 and 4, the actuator 91 is coupled to the closed position locking unit 121 via the first link 130, the second link 140, the third link 150, and the locking link 160. Thus, it is possible to reliably transmit the driving force of the actuator 91 to the closed position locking unit 121 via these links.

As illustrated in FIGS. 6 and 11, the third link 150 is forced to rotate by the driving force of the actuator 91. During the opening operation on the door 61, the third link 150 is forced to rotate in the direction indicated by the arrow AR3 illustrated in FIG. 3 so as to release the door 61 locked by the closed position locking unit 121 as illustrated in FIG. 7. During the closing operation on the door 61, the third link 150 is forced to rotate in the direction indicated by the arrow AR9 illustrated in FIG. 11 so as to release the door 61 locked by the open position locking unit 111 as illustrated in FIG. 12. In this way, by rotating the third link 150, it is possible to release the door 61 locked at the closed position and to release the door 61 locked at the open position.

As illustrated in FIG. 3, the third link 150 is provided with an slot 152. The locking link 160 is engaged with the slot 152. By moving the locking link 160 relative to the third link 150 along the slot 152, it is possible to disengage the locking link 160 from the third link 150 so as to remove the locking link 160 from the third link 150. Even in such an event that the lock of the door 61 at the closed position cannot be automatically released due to an malfunction of the closed position locking unit 121, the operator may manually remove the locking link 160 from the third link 150 so as to release the door 61 locked by the closed position locking unit 121.

Since the third link 150 is located inside the cab 30 when the door 61 is at the closed position, the operator who is seated in the cab 30 can easily access the third link 150. Thus, the operator can manually unlock the door 61 and get out of the cab 30.

As illustrated in FIG. 5, the first link 130 is coupled to the bracket 40 by the coupling pin 131. The first link 130 is coupled to the second link 140 by the coupling pin 132. The second link 140 is coupled to the third link 150 by the coupling pin 142. The coupling pins 131, 132 and 142 are configured to be detachable. In this way, even if the actuator 91 is not operational, it is possible to manually open or close the door 61 by pulling out one or more of these coupling pins.

When the door 61 is at the closed position, the coupling pins 131, 132 and 142 are located inside the cab 30, and thus, the operator who is seated in the cab 30 can easily access the coupling pins 131, 132 and 142. The operator may manually pull out any of the coupling pins 131, 132 and 142 and open the door 61 manually so as to get out of the cab 30.

The present disclosure is applicable to various work machines including a cab. The work machine described in the present disclosure is not limited to a wheel loader, it may be a bulldozer, a hydraulic excavator, a motor grader, a crane or a forestry machine.

It should be understood that the embodiments disclosed herein have been presented for the purpose of illustration and description but not limited in all aspects. It is intended that the scope of the present invention is not limited to the description above but defined by the scope of the claims and encompasses all modifications equivalent in meaning and scope to the claims.

REFERENCE SIGNS LIST

10: wheel loader; 16: work implement; 30: cab; 31: cab body; 38: left rear pillar; 39: doorway; 40: bracket; 61: door; 62: hinge; 70: operation unit; 76: second operation unit; 91: actuator; 94: rod; 95, 97, 131, 132, 142: coupling pin; 96: support; 111: open position locking unit; 121: closed position locking unit; 122: catcher; 123, 210: striker; 124: catcher support; 130: first link; 140: second link; 150: third link; 151: shaft; 152: slot; 153: first contact portion; 154: second contact portion; 155: abutment portion; 160: locking link; 170: contact member; 173: first contact surface; 174: second contact surface; 180: arm; 181, 191, 204: rotation shaft; 182: engaging portion; 190: locking link; 192: one end; 193: other end; 200: latch member; 201: first arm; 202: coupling shaft; 203: second arm; 205: engaging portion; 215: engaging portion

The invention claimed is:

1. A cab for a work machine, the cab comprising:
a cab body which is formed with a doorway;
a door which is rotatably supported on the cab body so as to open and close the doorway;
a locking unit that locks the door so as to disable it from rotating relative to the cab body; and
an actuator that generates a driving force to unlock the door locked by the locking unit,
wherein the actuator is mounted on the cab body and supported by the cab body,
the actuator further generates a driving force to open and close the door, and
the locking unit comprises:
a closed position locking unit configured to lock the door at a closed position in which the doorway is closed; and
an open position locking unit configured to lock the door at an open position in which the doorway is opened.

2. The cab for a work machine according to claim 1, further comprising a link unit that links the actuator and the locking unit.

3. The cab for a work machine according to claim 2, wherein
the link unit includes a rotation member that rotates upon receiving a driving force from the actuator.

4. The cab for a work machine according to claim 3, wherein
the rotation member is provided with a slot, and
the link unit further includes an engagement member that engages with the slot.

5. The cab for a work machine according to claim 2, wherein
the link unit includes at least one pin coupler that couples a first member and a second member with a pin, and
the pin is detachable from the pin coupler.

6. A work machine comprising:
a work implement; and
a cab according to claim 1, in which an operator who operates the work implement is seated.

* * * * *